United States Patent Office 3,481,822
Patented Dec. 2, 1969

3,481,822
GLASS REINFORCED EPOXY ANHYDRIDE POLYMERS
Harry S. Wilson, Cincinnati, David Gerald Glasgow, Centerville, and Ival O. Salyer, Dayton, Ohio, assignors to Monsanto Research Corporation, St. Louis, Mo., a corporation of Delaware
No Drawing. Filed Nov. 14, 1966, Ser. No. 593,687
Int. Cl. B32b 27/38, 17/10; C09j 3/16
U.S. Cl. 161—93
10 Claims The invention described herein was made or conceived in the course of, or under, a contract with the U.S. Atomic Energy Commission.

This invention relates to solid, high strength products and more particularly provides new and valuable composite structures, and the method of making the same.

As disclosed in copending application Ser. No. 593,751, filed of even date, valuable structural materials, including objects of diverse shapes and forms, are provided when certain epoxidized anhydrides are polymerized in the presence of an inorganic fibrous reinforcing agent. The in-situ homopolymerization of the epoxy anhydrides results in firm bonding of the polymer to the reinforcing agent, thereby resulting in composites comprising the fibrous material and the homopolymer as the matrix therefor.

Now we have found that the addition of certain phenolic compounds to the epoxy anhydrides in the preparation of the presently provided composites results in improved flexural strength of the composites. Fabrication of the presently provided composites involves polymerization, by heating at a temperature of 100° C. to 400° C. and while in contact with an inorganic fibrous reinforcing agent, an alicyclic epoxy anhydride of the formula

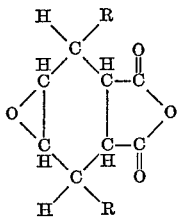

wherein R is hydrogen or alkyl of from 1 to 5 carbon atoms, in the presence of from 0.5% to 5.0% by weight, based on the epoxy anhydride, of a phenol of the formula

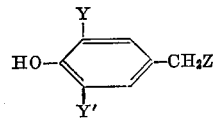

wherein Y is an alkyl radical of from 1 to 5 carbon atoms, Y' is hydrogen or Y, and Z is hydrogen or

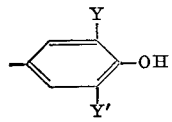

Examples of alicyclic epoxy anhydrides of the first above formula are:

4,5-epoxycyclohexane-1,2-dicarboxylic anhydride,
3-methyl-4,5-epoxycyclohexane-1,2-dicarboxylic anhydride,
3,6-dimethyl-4,5-epoxycyclohexane-1,2-dicarboxylic anhydride,
3-ethyl-6-methyl-4,5-epoxycyclohexane-1,2-dicarboxylic anhydride,
3,6-dipropyl-4,5-epoxycyclohexane-1,2-dicarboxylic anhydride,
3-methyl-6-propyl-4,5-epoxycyclohexane-1,2-dicarboxylic anhydride,
3,6-dibutyl-4,5-epoxycyclohexane-1,2-dicarboxylic anhydride,
3-ethyl-6-butyl-4,5-epoxycyclohexane-1,2-dicarboxylic anhydride,
3,6-dipentyl-4,5-epoxycyclohexane-1,2-dicarboxylic anhydride,
3-pentyl-6-methyl-4,5-epoxycyclohexane-1,2-dicarboxylic anhydride, etc.

Examples of phenols of the second above formula are:

2,4-xylenol,
2,4,6-trimethylphenol,
4,4'-methylene-bis(2-methylphenol),
4,4'-methylene-bis(2,6-dimethylphenol),
2-ethyl-4-methylphenol,
2,6-diethyl-4-methylphenol,
2-ethyl-4,6-dimethylphenol,
4,4'-methylene-bis(2-ethyl-6-methylphenol),
2,6-dipropylphenol,
4,4'-methylene-bis(2,6-di-tert-butylphenol),
2-pentyl-6-propylphenol,
4,4'-methylene-bis(2-butyl-6-pentylphenol), etc.

Although the mechanism by which the phenols operate is not known, it is believed that increase of flexural strength of composites made from mixtures of the aforementioned epoxy anhydrides and said phenols is not related to a cross-linking function because the effect is demonstrated with either the mono-functional or di-functional compounds. It may be that the phenolic hydroxy simply reacts with the terminal anhydride and/or epoxy groups of the polymer chain. Irrespective of the underlying mechanism, increase in flexural strength is brought about by employing only very small amounts of the phenolic additive, say, amounts of from 0.5% to 5.0% on the weight of the epoxy anhydride.

The reinforcing agents which are employed in preparing the presently provided composites may be any suitable inorganic fibrous materials, e.g., asbestos fibers, glass fibers, boron fibers, carbon fibers, silicon fibers, etc. The fibers may be woven, in filament or rovings form, sized or unsized.

For the preparation of laminates the mixture of the epoxy anhydride and phenol is positioned between sheets of an inorganic fibrous reinforcing material to obtain a stacked structure comprising a plurality of each of said sheets separated by a layer of the epoxy anhydride-phenol mixture. The structure is then submitted to compression molding at a pressure of 50 to 5000 p.s.i. and a temperature of 100° C. to 400° C. Preferably, the epoxy anhydride-phenol mixture, in finely comminuted solid form, is sprinkled on each ply of the inorganic fibrous textile before the next ply is stacked on it. Thereby there are obtained alternating layers of textile and epoxy anhydride-phenol mixture.

Shaped hollow forms comprising the present composites may also be fabricated by filament winding techniques. For example, glass fiber is passed through a solution of the epoxy anhydride-phenol mixture in a suitable solvent and the thus-treated fiber is subsequently wound onto a mandrel under tension and heated to effect polymerization. This results in adhesion of the coated filaments to each other. As examples of suitable solvents may be mentioned the chlorobenzenes including 1,2,4-trichlorobenzene, o-dichlorobenzene and chlorobenzene, or polar solvents such as dimethyl sulfoxide, dimethylformamide, tetrahydrofuran, etc.

Composites comprising the inorganic, fibrous reinforcing agents may also be prepared by mixing the filaments or rovings with the comminuted epoxy anhydride-phenol mixture, e.g., on a rolling mill, and compression molding the mixture at a pressure of from 50 to 5000 p.s.i. and a temperature of 100° C. to 400° C.

In order to prepare cast objects, a solution of the epoxy anhydride-phenol mixture in a suitable solvent is slurried with the inorganic fibrous filaments or rovings and poured into a mold. Heating the mold from 100° C. to 400° C. results in simultaneous removal of the solvent and polymerization of the anhydride/phenol mixture. There is thus obtained a strong, integral unit.

The presently provided composites are useful for a wide variety of applications, but of particular importance are those uses in fields requiring substantial flexural strength and low deflection upon bending. The compression molded composites, which may be of any shape or form, are strong, rigid, moisture resistant, and exceptionally resistant to shock. In addition, the composites obtained by the practice of this invention have good surface smoothness and dimensional stability. The invention thus provides a means of fabricating valuable housings of any kind, furniture such as chairs, structural panels, tiles, etc.

The invention is further illustrated by, but not limited to the following examples.

EXAMPLE 1

Two laminates were made from four plies each of heat cleaned glass cloth (4.5" x 4.5") and a mixture of 4,5-epoxycyclohexane-1,2-dicarboxylic anhydride and either 2,6-di-tert-butyl-4-methylphenol or 4,4'-methylene-bis-(2,6-di-tert-butylphenol). The phenol was present in a concentration of 2.0% by weight of the epoxy anhydried.

After thoroughly mixing the epoxy anhydride with each of the phenols, the resulting mixtures were sprinkled on 4 plies of heat-cleaned glass cloth and on the supporting clean, polished plate in the following proportions:

3.45 g. of mixture sprinkled on polished plate over a 4.5" x 4.5" area
2.4 g. of mixture sprinkled on ply 1
2.4 g. of mixture sprinkled on ply 2
2.4 g. of mixture sprinkled on ply 3
3.45 g. of mixture sprinkled on ply 4

The plies were stacked on top of each other as the mixtures were deposited, and a second clean, polished plate was placed over the top ply. The total weight of the glass cloth for each laminate was 15.5 g.; that of epoxy anhydride-phenol mixture in each laminate was 14.1 g.

The assembly was placed in a press, and the bottom press platen was raised so that the top polished plate would contact the upper press platen for good heat conductivity. The temperature was raised to about 160° C. and held at that point until the resin began to flow. The press was pumped up and down to determine, by visual observation, when the resin was no longer flowing. After the resin no longer showed signs of flowing, 500 p.s.i. of pressure was applied and the temperature raised to 250° C. and held at that point. The pressure and temperature were maintained at these values for 1.5 hours. The laminate was then allowed to cool slowly while the pressure was maintained at 500 p.s.i. After cooling, the laminate was removed from the press and post-cured for 3 hours at 176.7° C. (350° F.) and 3 hours at 204.4° C. (400° F.). The laminate made in the presence of 2,6-di-tert-butyl-4-methylphenol gave a flexural strength of 84,840 p.s.i. at room temperature, while the laminate made in the presence of 4,4' - methylene bis(2,6 - di - tert - butylphenol) gave a value of 88,570 p.s.i. at room temperature.

We claim:

1. A composite structure comprising an inorganic fibrous reinforcing agent and, as a matrix therefore, a polymer obtained by heating at 100° C. to 400° C. an alicyclic epoxy anhydride of the formula

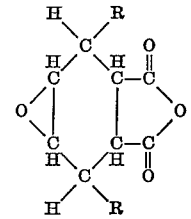

wherein R is hydrogen or alkyl of from 1 to 5 carbon atoms, in the presence of from 0.5% to 5.0% by weight, based on the anhydride, of a phenol of the formula

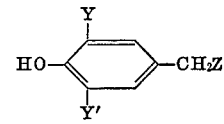

wherein Y is an alkyl radical of from 1 to 5 carbon atoms, Y' is hydrogen or Y, and Z is hydrogen or

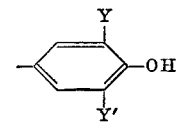

2. The composite structure defined in claim 1, further limited in that the epoxy anhydride is 4,5-epoxycyclohexane-1,2-dicarboxylic anhydride.

3. The composite structure in claim 1 further limited in that the epoxy anhydride is in finely comminuted form.

4. The composite structure defined in claim 1 further limited in that the inorganic fibrous material is glass cloth.

5. The composite structure defined in claim 1 further limited in that the phenol is 2,6-di-tert-butyl-4-methylphenol.

6. The composite structure defined in claim 1 further limited in that the phenol is 4,4'-methylene-bis(2,6-di-tert-butylphenol).

7. The composite structure defined in claim 1 further limited in that the epoxy anhydride is 4,5-epoxycyclohexane-1,2-dicarboxylic anhydride and the phenol is 2,6-di-tert-butyl-4-methylphenol.

8. The composite structure defined in claim 1 further limited in that the epoxy anhydride is 4,5-epoxycyclohexane - 1,2 - dicarboxylic anhydride and the phenol is 4,4'-methylene-bis(2,6-di-tert-butylphenol).

9. The composite structure defined in claim 1 further limited in that the epoxy anhydride is in finely comminuted form, the inorganic fibrous material is glass cloth, the epoxy anhydride is 4,5-epoxycyclohexane-1,2-dicarboxylic anhydride, and the phenol is 2,6-di-tert-butyl-4-methylphenol.

10. The composite structure defined in claim 1 further limited in that the epoxy anhydride is in finely comminuted form, the inorganic fibrous material is glass cloth, the epoxy anhydride is 4,5-epoxycyclohexane-1,2-dicarboxylic anhydride, and the phenol is 4,4'-methylene-bis(2,6-di-tert-butylphenol).

(References on following page)

References Cited

UNITED STATES PATENTS

| | | | |
|---|---|---|---|
| 3,362,932 | 1/1968 | Mauz. | |
| 3,308,094 | 3/1967 | Sherr | 161—185 X |
| 3,278,456 | 10/1966 | Starcher et al. | |
| 3,268,476 | 8/1966 | Mueller | 161—185 X |
| 3,159,595 | 12/1964 | Parry | 161—184 X |
| 2,985,616 | 5/1961 | McGary | 161—184 X |
| 2,794,028 | 5/1957 | Phillips et al. | |

ROBERT F. BURNETT, Primary Examiner

M. A. LITMAN, Assistant Examiner

U.S. Cl. X.R.

156—330; 161—185, 203; 260—2, 348